(12) United States Patent
Schutz

(10) Patent No.: US 8,046,982 B1
(45) Date of Patent: Nov. 1, 2011

(54) GATHERING DEVICE FOR SOFT OBJECTS

(76) Inventor: David F. Schutz, Maplewood, MN (US)

( * ) Notice: Subject to any disclaimer, the term of this patent is extended or adjusted under 35 U.S.C. 154(b) by 236 days.

(21) Appl. No.: 12/459,508

(22) Filed: Jul. 2, 2009

Related U.S. Application Data

(63) Continuation of application No. 11/222,902, filed on Sep. 10, 2005, now abandoned.

(51) Int. Cl.
*A01D 7/00* (2006.01)

(52) U.S. Cl. ......... 56/400.11; 294/1.3; 294/1.4; 294/1.5

(58) Field of Classification Search .. 56/400.11–400.15, 56/400.17; 294/55.5, 55, 1.3–1.5; 209/417
See application file for complete search history.

(56) References Cited

U.S. PATENT DOCUMENTS

| | | | |
|---|---|---|---|
| 62,730 A | 3/1867 | Brown et al. | |
| 420,608 A | 2/1890 | Rowland | |
| 427,055 A * | 5/1890 | Cushing | 209/419 |
| 591,691 A | 10/1897 | Reddick | |
| 691,843 A | 1/1902 | Craig | |
| 1,095,585 A | 5/1914 | Mack | |
| 1,141,423 A | 6/1915 | Simas | |
| 1,257,415 A | 2/1918 | Smith | |
| 1,267,778 A | 5/1918 | Leen | |
| 1,576,113 A * | 3/1926 | Gaughan | 56/327.1 |
| 2,035,799 A | 3/1936 | Dippel | |
| D206,076 S | 10/1966 | Lehman | |
| 4,635,987 A * | 1/1987 | Hurtgam | 294/19.2 |
| 4,828,690 A * | 5/1989 | Montez | 209/418 |
| 5,246,260 A | 9/1993 | Racicot | |
| 5,590,924 A | 1/1997 | Quinn et al. | |
| 2002/0149215 A1 * | 10/2002 | McLaughlin | 294/1.3 |

FOREIGN PATENT DOCUMENTS

GB 2125661 A 3/1984

\* cited by examiner

*Primary Examiner* — Alicia Torres
(74) *Attorney, Agent, or Firm* — Berggren Law Offices, LLC; William R. Berggren

(57) ABSTRACT

An apparatus for retrieving soft objects, the apparatus comprising a storage section, a gathering section, a rim and an elongated handle. The storage section is shaped like an open basket on its side and having a top and a bottom. The gathering section extends from the bottom of the storage section, comprises two barrier regions separated by a retaining region, and has a leading edge. The rim is attached at least to the leading edge. The handle projects upward from the top of the storage section at such an angle to permit a raking motion when collecting objects. Also a method for gathering soft objects on the ground including the steps of rotating handle of above apparatus to place its bottom on the ground, pulling the apparatus over fruit-laden ground, and rotating handle so bottom is on top to move the objects elsewhere.

14 Claims, 4 Drawing Sheets

GATHERING DEVICE FOR SOFT OBJECTS

CROSS-REFERENCE TO RELATED REFERENCES

This application is a continuation of application Ser. No. 11/222,902, filed Sep. 10, 2005 now abandoned.

FIELD OF THE INVENTION

This invention relates to a rake-like apparatus for gathering objects, particularly objects that may be damaged by sharp protrusions.

BACKGROUND OF THE INVENTION

Shovels and rakes have been around for many decades but none are suitable for gathering objects that are easily damaged. Such objects include fruit of many types.

Shovels require a scooping and lifting action that is unsatisfactory for several reasons. The scooping and lifting action places excessive strain on the back of a person doing the shoveling. In addition, the shovel often has a shallow storage area. Also, the gathering area is generally flat, permitting round-like objects to inadvertently leave the scoop when the shovel is repeatedly used to gather the objects before transferring them elsewhere.

Rakes require a pulling action that is unsatisfactory for different reasons. While a pulling action to concentrate objects causes less strain on a person's back, a person must then stoop to pick up the objects or do another step such as transfer them in to a basket for carrying.

Rakes with storage sections are known but also have problems. The raking motion is less stressful on a person's back as mentioned above. However, the known devices have specific uses such as for gathering hard objects such as, for example, clams or golf balls. These devices generally are unsuitable for gathering round-like soft objects such as, for example, apples, oranges, peaches and other fruit. The fruit easily spills out if the device is used repeatedly to gather more fruit before the device is used to transfer the fruit to another location. Also, the gathering area generally has exposed tines suitable for digging in sand, dirt or other surfaces. These tines can also damage soft objects such as fruit.

There is a need for an apparatus for gathering soft, round-like objects such as fruit without adversely damaging the objects and rendering them less useful.

SUMMARY OF THE INVENTION

I have invented an apparatus for retrieving soft objects with minimal stress to the back and adverse damage to the objects. The apparatus comprises a storage section, a gathering section, a rim and an elongated handle. The storage section is shaped like an open basket on its side and having a top and a bottom. The gathering section extends from the bottom of the storage section, comprises at least two barrier regions separated by a retaining region where each barrier region has a height of more than one-half inch and less than two inches, and has a leading edge. The rim is attached at least to the leading edge. The handle projects upward from the top of the storage section at such an angle as to permit a raking motion when collecting objects.

I have also invented a method of gathering soft objects comprising the following steps. An apparatus is provided that comprises an open storage section, a gathering section with two barrier regions separated by a retaining region where each barrier region has a height of more than one-half inch and less than two inches and a leading edge, a rim attached at least to the leading edge, and a handle attached to the storage section and passing at an angle to the gathering section to permit a rake-like motion when used to gather objects. The handle is rotated to position the apparatus so that the rim is touching a surface on which lay the objects desired to be gathered. The apparatus is pulled with sufficient speed to permit the gathering section to slide over a surface containing objects to be gathered and the inertia of the objects to cause them to at least enter the gathering section.

The apparatus permits additional steps to transport the objects. When one wishes to transport the gathered objects to another location, the handle may be rotated sufficiently to turn the gatherer into a carrier. The carrier is then transported to another place. Then the handle is rotated sufficiently to deposit the objects at that location The invention offers several benefits over what has been known to the art. One advantage is that many soft objects can be gathered quickly with minimal stress to the back of the person doing the task. Another benefit is that soft objects can be gathered quickly with minimal damage to the objects. This is particularly useful when the objects are fruit such as, for example, apples, oranges or peaches. Other advantages will become apparent to those of ordinary skill in the art.

BRIEF DESCRIPTION OF THE DRAWINGS

An embodiment of the invention is described in the accompanying drawings. The drawings are briefly described below.

DETAILED DESCRIPTION OF SOME EMBODIMENTS OF THE INVENTION

The apparatus I have invented is useful for gathering objects from a surface without undue back strain caused from bending over to pick up the objects. It is particularly useful for gathering soft objects that are easily damaged such as, for example, apples, oranges, peaches, and other fruit.

In general, the apparatus includes a storage section, a gathering section, a rim and an elongated handle. The storage section is the section suitable for storing the gathered objects until they are brought to another location. Preferably, the storage section has porous openings in the body of the storage section that are smaller than the objects being gathered but larger than some unwanted debris that may also be collected such as, for example, grass and small rock.

The storage section is shaped like an open basket on its side having a top and a bottom that define the upper and lower sides of the storage section. The section also has a depth extending from the opening of the basket on one side to the part of the basket furthest from the opening. The depth should be sufficient to allow the holding of a suitable amount of gathered objects before carrying them elsewhere. The storage section may be of any suitable shape for holding objects including, for example, cubic, semicircular or semi-ellipsoid. When semicircular or semi-ellipsoid, the section has an axis of curvature that is substantially parallel to the plane of the gathering section and substantially perpendicular to the elongated handle. The parallel and perpendicular natures of orientation can be varied as long as the purpose of the invention is maintained.

The storage section can be formed in various ways with various materials that range from flexible to rigid to accomplish the function mentioned above. An embodiment of a flexible storage section is one formed from strings fashioned like a net attached to an edge encompassing the top and bottom edges of the opening of the storage section. The edge is preferably formed from something stiff such as, for example, a stiff wire to give the basket opening some semi-permanent shape. The depth and curvature of a storage section made of flexible material is not fixed and permanent but is generally irregular and varies with the position of the apparatus and number and weight of the objects within.

An embodiment that is more rigid is one formed by a series of tines made of something more rigid such as, for example, metal or plastic. The tines can be arranged in a cross-hatch pattern or substantially parallel fashion or a more irregular pattern. The depth and curvature of the storage section of this embodiment are generally more fixed and permanent than that of more flexible embodiments.

Figure 1:
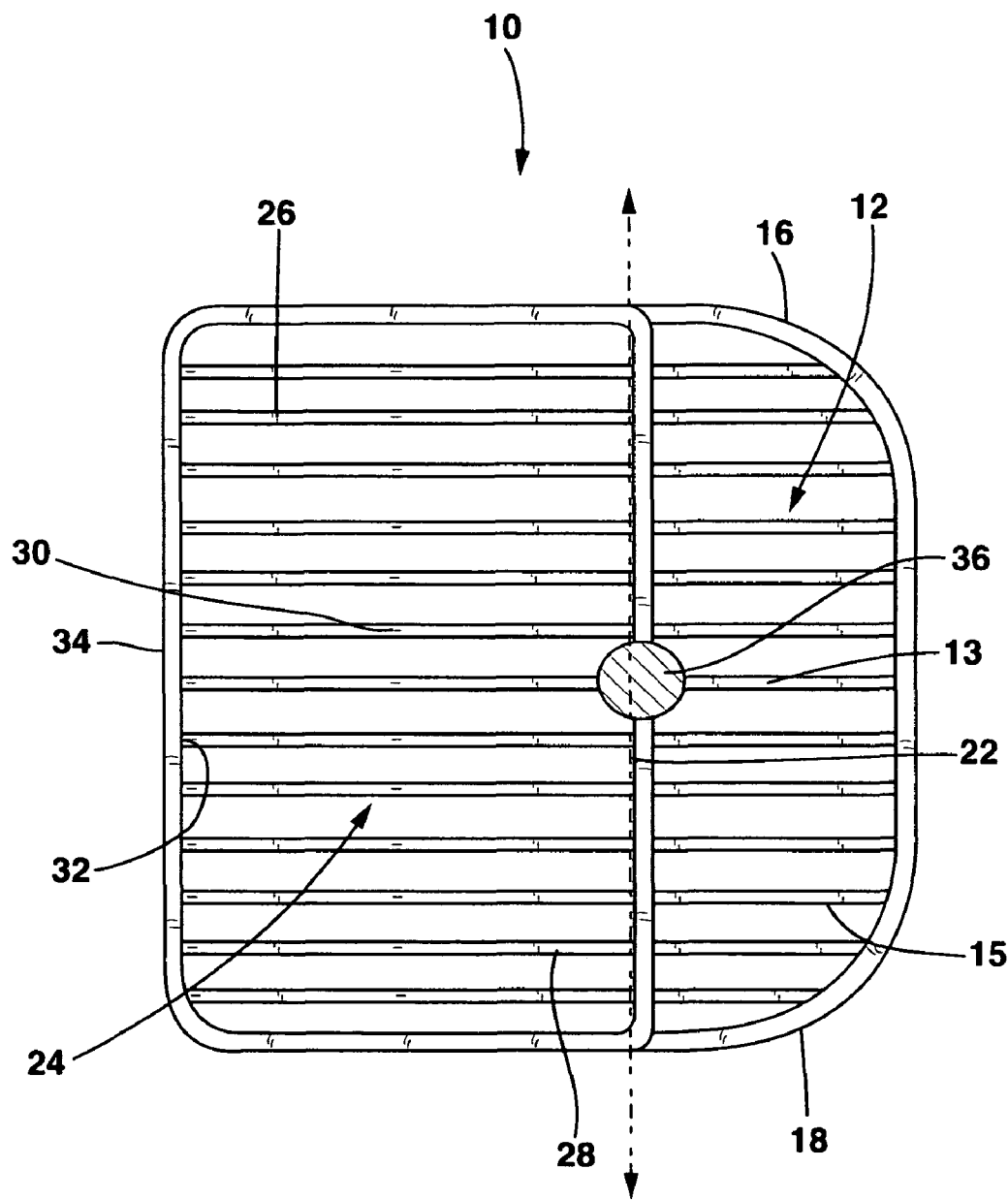
FIG. 1 is a top view of an embodiment of the apparatus in a gathering position
Figure 2:
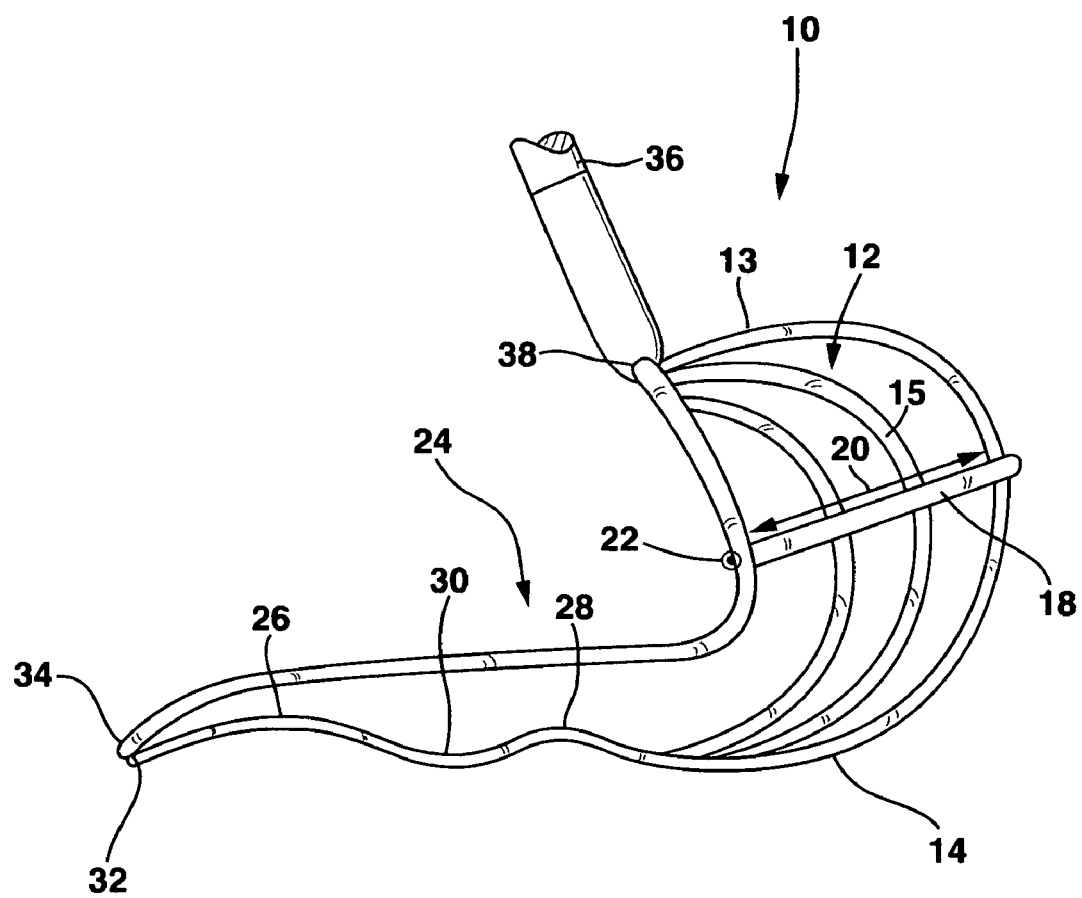
FIG. 2 is a side view of an embodiment of the apparatus in a gathering position
Figure 3:
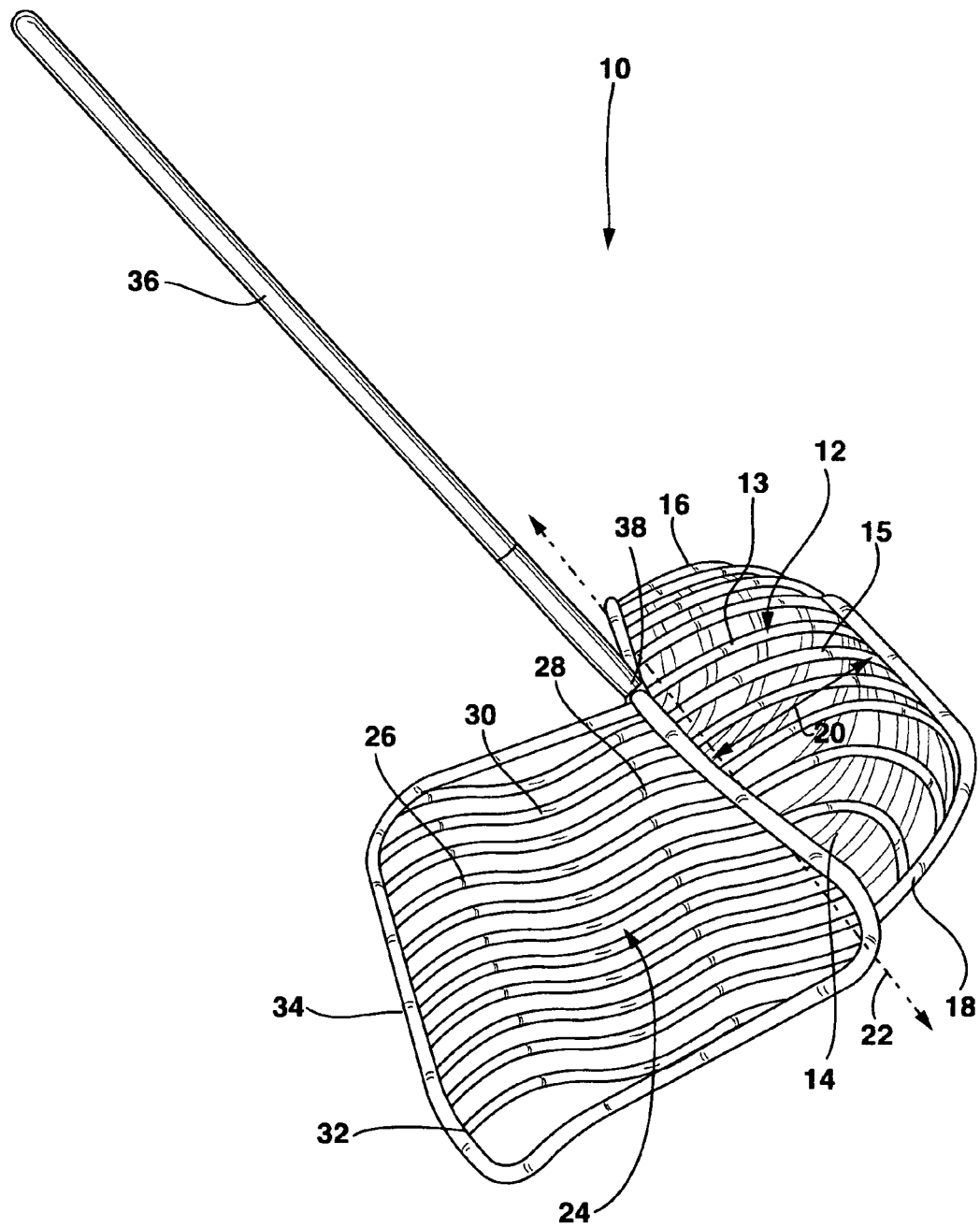
FIG. 3 is a perspective view of an embodiment of the apparatus in a gathering position
Figure 4:
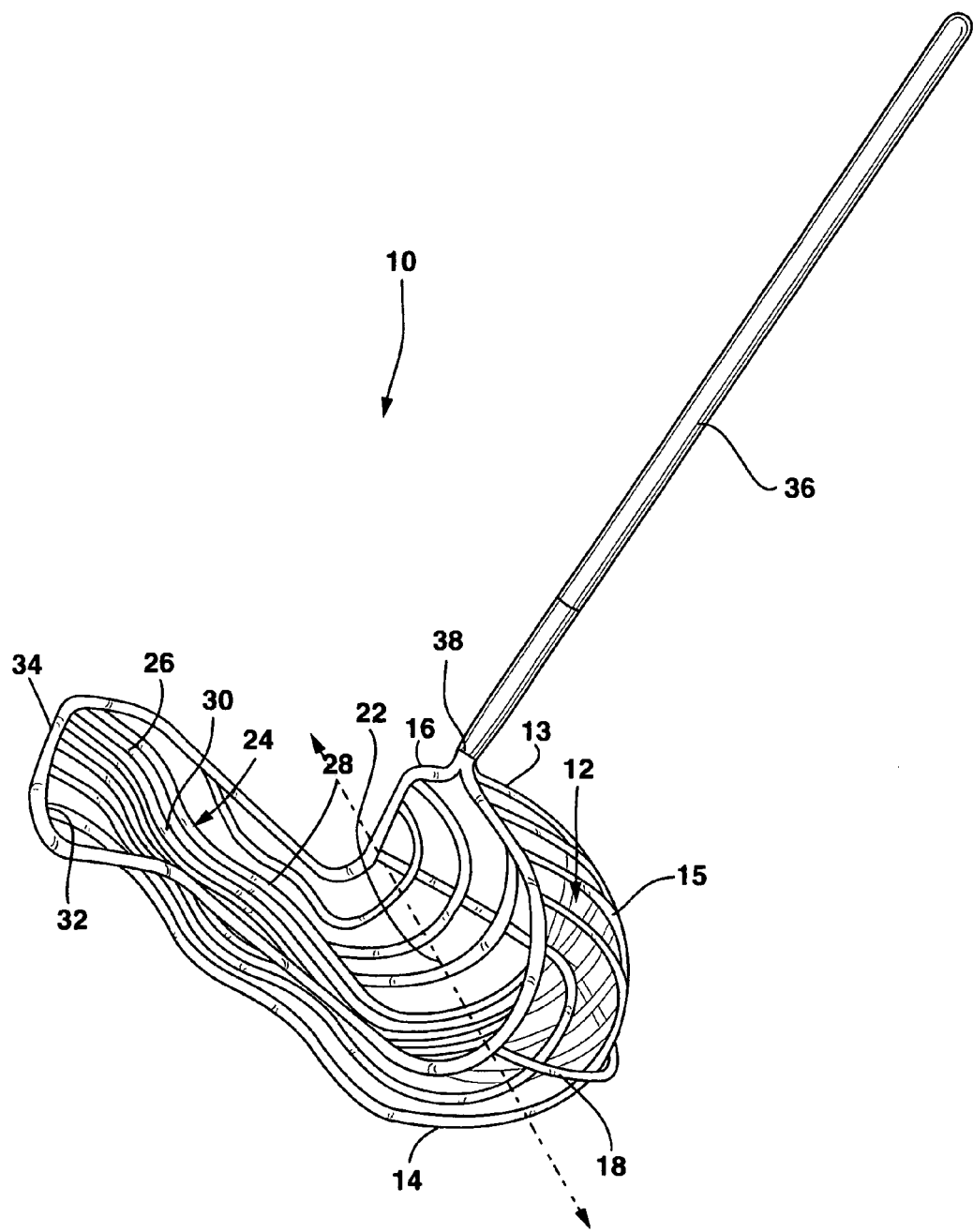
FIG. 4 is a perspective view of an embodiment in a carrying position.

An embodiment illustrating the more rigid type of storage section is shown in FIGS. 1-4. FIG. 1 illustrates the top view of the apparatus and FIG. 2 a side view. FIG. 3 illustrates the apparatus in a gathering position and FIG. 4 illustrates the apparatus in a carrying position. Numbers for the elements are the same for all figures.

The apparatus 10 shown in the figures comprises a storage section 12 having a top 13, a bottom 14 and formed with multiple tines 15 in an open basket configuration. The configuration has a left side 16, a right side 18, a depth 20 and an axis of curvature 22. The tines comprise base tines and side tines. The base tines occupy similar planes in a similar arrangement, each curving around the axis of curvature 22 in a manner ranging between somewhat semi-circular to somewhat semi-ellipsoid. The side tines 16, 18 are substantially parallel to the base tines but in a plane somewhat perpendicular to the planes of the base tines. Together, the base tines and side tines form the storage section. These tines are separated by a space that is less than the diameter of the smallest object desired to be gathered and enough to permit some unwanted material not to be retained. Materials useful for making the tines include plastic and metal. Additional references will be made to the embodiment illustrated in the figures following general discussions of other parts of some embodiments of the apparatus of the invention.

Various techniques may be used to bind the tines into a desired storage configuration. These include, affixing to the aligned tines one or more pieces of cross strips of somewhat rigid material such as metal or plastic by methods well known to the art such as, for example, use of adhesives or welds. The embodiment shown in the figures used a cross tine that was welded to the back of the storage section opposite its opening.

Another element of the invention is the gathering section. This section is the one that is suitable for retaining objects that are to be acquired through multiple rake-like pulling actions. Its function is to help prevent objects that have entered the storage section from leaving as more objects are gathered by the multiple raking actions.

In general, the gathering section extends from the bottom of the storage section in a manner to permit objects to pass over the gathering section and into the storage section. The general plane of the gathering section is typically perpendicular to the plane of the opening of the storage section. However, the angle may vary as long as the apparatus functions to gather and retain objects until they are later released. The gathering section comprises two barrier regions separated by a retaining region, a bottom, and has a leading edge. This section can be either solid or porous. Examples of a solid section would be one made of a sheet of metal or plastic and having at least two parallel ridges as barrier regions separated by a valley going to the bottom of the gathering section that acts as a retaining region, the ridges and valley being substantially parallel to the opening of the storage section and having a height between the top of the ridges to the bottom of the valleys. This section could be affixed to the lower edge of the storage section by any means commonly known to the art, including use of adhesives or welds. Alternatively, the gathering section could be unified in construction with the storage section, such as, for example, is shown in the embodiments illustrated in the figures.

Surprisingly, the barrier regions, or ridges, separated by a retaining region, or valley, must have some specific characteristics for the apparatus to be able to be used to gather and retain soft objects. First, there must be at least two barriers. When only one barrier was used, soft objects tended to easily fall back out of the storage section when the apparatus was drawn back to allow for a second forward motion to gather more soft objects. There could be more that two barriers as long as the gathering section does not become too lengthy and thus cumbersome. Second, the height of a barrier as measured from the bottom of the gathering section to the top of the barriers must be more than a half inch and less than two inches. Some embodiments had barrier heights of between 0.75 inch and 1.5 inches. Still other embodiments had barriers with heights of between 0.75 inch and 1.0 inch.

The length of the gathering section is sufficient to gather and retain objects when the apparatus is used repeatedly in the gathering mode. Typically the length may range from a portion of the depth of the storage section to more than the depth of the storage section for embodiments having rigid storage sections.

One embodiment that is more porous is one formed by a series of tines made of something rigid such as, for example, metal or plastic. The tines can be arranged in a cross-hatch pattern or substantially parallel fashion or a less regular pattern, and also fashioned with at lease two parallel ridges separated by a valley. An embodiment illustrating the later is shown in that the figures and will now be discussed in more detail.

The apparatus 10 shown in the figures also has a gathering section 24. The gathering section extends from the bottom 14 of the storage section 12, comprises two barrier regions, 26 and 28 separated by a retaining region 30, and has a leading edge 32.

The gathering section of the embodiment is formed with an aggregate of tines that form rippled surface having a leading edge 32, a length at least half the depth of the storage section, and at least two convex regions, 26 and 28, that form barrier regions with heights of at least 0.5 inch and not more than 2.0 inches and one concave region 30 that forms the retaining region, each with an axis of curvatures substantially parallel to the axis of curvature 22 of the storage section. Materials useful for making the tines include plastic and metal.

The length of the gathering section for this embodiment is at least half the depth of the storage section. Preferably the length of the gathering section is at least equal to the depth. This allows better retention of the objects being gathered during multiple rake-like motions. The side view of the embodiment, shown in FIG. 2 illustrates a length of the gathering section 24 of at least the length of the depth 20 of the storage section 12.

Optionally, the gathering section has sides elevated above the bulk of the section. This minimizes the likelihood of objects falling from the apparatus prematurely from lateral motion. The sides may be formed by tines having elevated height when compared with the aggregate that form the gathering section. They may also be solid strips of material affixed to the tines of the gathering section at the furthermost sides of the gathering section and lying at an upward angle from the plane of the tine aggregate.

Various techniques may be used to bind the tines into a desired gathering configuration. These include, affixing to the aligned tines pieces of cross strips of somewhat rigid material such as metal or plastic by methods well known to the art such as, for example, with use of adhesives or welds. The method of manufacture used in the embodiment shown in the figures had the tines forming the storage section 12 extend from the lower portion 14 of that section outward to also form the gathering section 24. The leading edge 32 was then welded to a rim 34 at the end of the lower portion of the tines to stabilize the shape.

The third element of the invention is the rim that is attached at least to the leading edge of the gathering section. The function of the rim is to prevent the leading edge of the gathering section form causing damage to objects being gathered. As such, the rim may range from materials that are soft like rubber to those that are hard like metal or plastic. Preferably the rim has a thickness that is sufficiently small to permit easy gathering of desired objects when apparatus is pulled in a raking motion. Preferably the rim also has a thickness that is large enough to prevent cutting of a soft object during the same pulling action.

Some embodiments of the invention have a rim that is curved about an axis parallel to the leading edge. The diameter of curvature should be large enough to prevent cutting of soft objects being gathered but not large enough to prevent the object from being drawn into the apparatus by a raking pulling action. Typically, the diameter is preferably greater than a millimeter and less than 10 millimeters. An embodiment illustrating a form of this embodiment is shown in the figures that will now be discussed in more detail.

The apparatus 10 shown in the figures illustrates a rim 34 affixed to the leading edge 32 of the gathering section 24. In this embodiment, the rim 34 is welded to the ends of the tines forming the leading edge 32. Also shown in this embodiment, the rim is extended to encompassing the outer edge of the storage section and the gathering section to help stabilize the position of the tines and further protect objects as they are gathered. The rim has a rounded cylindrical-like exposed surface that minimizes adverse damage to desired objects as they are gathered.

A preferable feature of the embodiment shown in the figures is that the storage section, gathering section and rim are unified. The tines form both the storage and gathering sections, and a rim encompasses the entire edge of both sections rather than just the leading edge of the gathering section. Preferably, the extended rim is elevated along the sides of the gathering section to minimize lateral motion of gathered objects resulting in premature removal of the objects from the apparatus.

The fourth element of the invention is an elongated handle. The elongated handle projects upward from the top of the storage section and has an angle to the gathering section sufficient to permit a raking motion for collecting objects. The elongated handle is in a plane that may be substantially perpendicular to the plane containing the top part of the storage section near the opening of the opening of that section. The handle may also form an angle with the plane of the gathering section that permits a raking motion to gather objects into the storage section. Preferably this angle is between 120 degrees and 0 degrees, more preferably between 110 degrees and 45 degrees, most preferably between 100 and 70 degrees.

The handle may be of any conventional material used for yard implements and is attached to the storage section by conventional means known to the art. Some examples of pole materials include, for example, wooden poles and hollow aluminum shafts. The apparatus shown in the figures has a wooden handle 36 fitted with a metal socket crimped at one end of the handle and welded to the top of the storage section 12. Other methods of attaching the handle to the storage section include, for example, use of a threaded screw arrangement or a socket and screw arrangement (38).

The method of using the apparatus is similar to that of a rake and a shovel. An apparatus is provided than includes an open storage section, a gathering section with at least two barrier regions with heights of at least 0.5 inch and not more than 2.0 inches separated by a retaining region and having a leading edge, a rim attached at least to the edge, and a handle attached to the storage section and at an angle to the gathering section sufficient to permit raking motions. The handle of the apparatus is rotated to position the apparatus so that the rim is touching a surface on which lays the objects desired to be gathered. FIG. 3 illustrates an embodiment in this position. The apparatus is then pulled with sufficient speed to permit the gathering section to slide over a surface containing objects to be gathered and the inertia of the objects to cause them to at least enter the gathering section if not the storage section. Optionally, subsequent repetitions of the pulling action will cause objects already in the gathering section to be pushed into the storage section by newly entering objects. Alternatively, the apparatus may be moved raise the rim off the surface to permit objects in the gathering section to move into the storage section before the pulling step is repeated to gather more objects.

The apparatus may also be used to transport the objects to another location like a shovel. Once the objects have been gathered as described above, the handle is rotated sufficiently to turn the gatherer into a carrier. Typically this means that the handle is rotated about 180 degrees about its axis. FIG. 4 illustrates an embodiment in this position. While the apparatus is in this position, it is transported to another desired location. Once there, the handle is rotated again until the objects are able to fall out of the storage section and be deposited at that location.

The apparatus of the invention can be made by conventional means known to the art. The embodiment illustrated in the figures was made by bending tines in to the shape shown and welding a rim about the arrangement. A support bar was welded to the back of the storage section and a metal sleeve was also welded to the storage section for attachment of the handle. Conventional wire forming machines could also have been used to form the metal tines of the apparatus. Similarly, plastic extrusion and injection molding machines could be used to make the apparatus if it were made of plastic.

Other modifications and changes made to fit particular operating requirements and environments will be apparent to those with ordinary skill in the art. Thus, the invention is not considered limited to the embodiments discussed for purposes of disclosure and covers all changes and modifications that do not constitute departures from the true spirit and scope of this invention.

I claim:

1. An apparatus for retrieving soft objects, comprising:
   a continuous rim having a leading edge, a top and two planes, one a substantially horizontal plane and the other a substantially vertical plane;
   a storage section having a top, a bottom, a front, a back, a depth and an axis of curvature, and comprising an aggregate of tines that is affixed to and extends from the top of the rim in a rearward direction about the axis of curvature to the back and then in a frontward direction about the axis of curvature to form the bottom with an opening at the front defined in the substantially vertical plane of the rim;

a gathering section comprising the aggregate of tines extending forward from the bottom of the storage section to the leading edge and having a width, a bottom that is substantially perpendicular to the opening in the storage section, a top for constraining the objects that is defined in the substantially horizontal plane of the rim, a length that is at least half the depth of the storage section, and at least two barrier regions that are approximately parallel to the leading edge and have widths that extend across the gathering section and heights that extend upward at least 0.5 inch and not more than 2.0 inches from the bottom of the gathering section and are separated by a retaining region, and each region has an axis of curvature substantially parallel to the axis of curvature of the storage section;

at least one cross tine having two ends with each end affixed to the rim and the cross tine affixed to the aggregate of tines to stabilize the space between adjacent tines; and an elongated handle projecting upward from the top of the rim and having an angle of between 110 degrees and 45 degrees to the gathering section to permit a raking motion to collect objects.

2. The apparatus of claim 1 wherein the barrier heights are between 0.75 inch and 1.5 inches.

3. The apparatus of claim 1 wherein the barrier heights are between 0.75 inch and 1.0 inch.

4. The apparatus of claim 1 wherein the tines and rim comprise metal.

5. The apparatus of claim 1 wherein the tines and rim comprise plastic.

6. The apparatus of claim 1 wherein the leading edge has a thickness that is sufficiently small to permit gathering of desired objects when apparatus is pulled in a raking motion.

7. The apparatus of claim 1 wherein the leading edge has a rounded exposed surface that minimizes adverse damage to desired objects as they are gathered.

8. The apparatus of claim 1 wherein the storage section, gathering section and rim are unified.

9. The apparatus of claim 1 wherein the angle is between 110 degrees and 70 degrees.

10. The apparatus of claim 1, wherein the gathering section further comprises a base and two sides and the aggregate of tines that comprise base tines and side tines, wherein the base tines occupy similar planes in a similar arrangement, each having a lower portion forming the base of the gathering section and an upper portion forming the top, back and bottom of the storage section, and the side tines are substantially parallel to the base tines but in a plane somewhat perpendicular to the planes of the base tines, thereby forming the sides of the storage section and gathering section.

11. The apparatus of claim 10, further comprising:

wherein the tines that form both the storage section and the gathering section are each separated from its neighboring tine by a space that is less than the diameter of the smallest object desired to be gathered and enough to permit some unwanted material not to be retained.

12. An apparatus for retrieving soft objects, comprising:

a continuous rim having two planes, one substantially horizontal plane and the other a substantially vertical plane;

a storage section for holding objects comprising multiple tines and having a top, a bottom, an opening between the top and bottom defined in the substantially vertical plane of the rim, a left side, a right side, a depth and an axis of curvature;

a gathering section extending from the bottom of the storage section comprising an aggregate of tines that form rippled surface, the aggregate having a leading edge, a length of the gathering region that is at least half the depth of the storage section, a bottom that is substantially perpendicular to the opening in the storage section, a top for constraining the objects defined in the substantially horizontal plane of the rim, and at least two convex barrier regions, each extending above the bottom with heights of at least 0.5 inch and not more than 2.0 inches and across the gathering section, and one non-storage concave retaining region with a bottom that separates the convex regions, each region with an axis of curvature substantially parallel to the axis of curvature of the storage section and in combination able to reduce occurrence of unintentional displacement of soft objects out of storage section, the gathering section having the leading edge and the bottom of the retaining region, and the bottom of the storage section that joins to the gathering section approximately in the same flat plane, and;

the rim encompassing the outer edge of the storage section and the gathering section to stabilize the position of the tines and protect objects as they are gathered; and an elongated handle projecting upward from the top of the storage section and having an angle of between 120 degrees and 0 degrees to the gathering section to permit a raking motion to collect objects.

13. Method of gathering objects, comprising:

providing the apparatus of claim 1, the apparatus comprising an open storage section with an opening, a gathering section with a bottom that is substantially perpendicular to the opening, a leading edge, and a base and comprising two barrier regions that are (1) approximately parallel to the leading edge, (2) extend above the bottom with heights of at least 0.5 inch and not more than 2.0 inches, and (3) are separated by a non-storage retaining region with a bottom, a rim attached at least to the edge, and a handle attached to the storage section where the bottom of the storage section, the bottom of the retaining region and the leading edge reside approximately in the same flat plane, and the handle forms an angle with the plane of between 120 degrees and 0 degrees to permit a raking motion;

rotating the handle to position the apparatus so that the rim is touching a surface on which lays the objects desired to be gathered; and pulling the handle with sufficient speed to permit the gathering section to slide over a surface containing objects to be gathered and the inertia of the objects to cause them to enter the storage section.

14. The method of claim 13 further comprising the steps of:

rotating the handle sufficiently to carry the objects;

transporting the apparatus with objects to another location; and rotating the handle sufficiently to deposit the objects at that location.

\* \* \* \* \*